L. O'D. HUTSON.
NUT LOCK.
APPLICATION FILED FEB. 23, 1910.
980,528.
Patented Jan. 3, 1911.
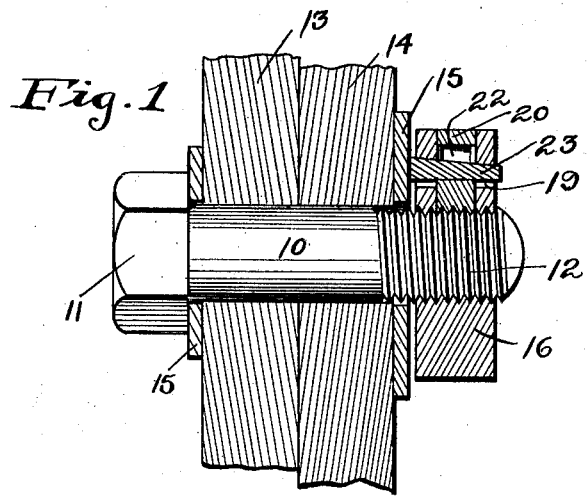
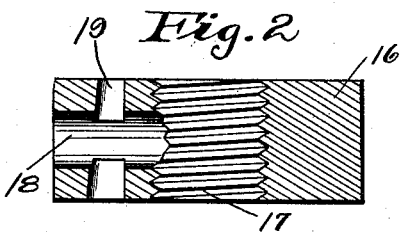
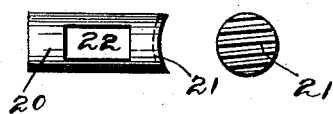
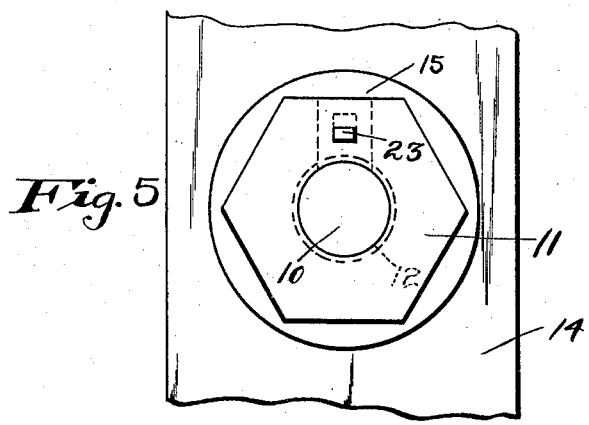
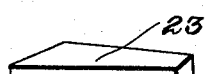
Witnesses
F. C. Caswell
W. A. Loftus.
Inventor
Lawrence O. Hutson
by J. Ralph Orwig Atty

UNITED STATES PATENT OFFICE.

LAWRENCE O'DELL HUTSON, OF BOONE, IOWA.

NUT-LOCK.

980,528. Specification of Letters Patent. Patented Jan. 3, 1911.

Application filed February 23, 1910. Serial No. 545,515.

*To all whom it may concern:*

Be it known that I, LAWRENCE O. HUTSON, a citizen of the United States, residing at Boone, in the county of Boone and State of Iowa, have invented a certain new and useful Nut-Lock, of which the following is a specification.

The object of my invention is to provide a nut lock of simple, durable and inexpensive construction in which the locking element is connected only with the nut and the nut may be used on any bolt without any change or alteration whatever in the bolt itself.
A further object is to provide a nut lock in which the nut locking is automatically done by screwing the nut on the bolt against the side of an article to be engaged by the nut and also to provide a lock of this kind in which the locking element may readily, quickly and easily be released in order to remove the nut from the bolt and at the same time to provide a locking device that will not become released under ordinary conditions of wear and vibration of the bolt and nut.

My invention consists in certain details, in the construction, arrangement and combination of the various parts of the device whereby the objects contemplated are attained, as hereinafter more fully set forth, pointed out in my claim and illustrated in the accompanying drawing, in which:

Figure 1 shows a sectional view of a nut lock embodying my invention and applied to a bolt, and two articles to be clamped together by the bolt and nut. Fig. 2 shows an enlarged, detail, sectional view of a nut embodying my invention. Fig. 3 shows a side view of the sliding locking bar forming part of my improved nut lock. Fig. 4 shows an end view of same to illustrate the screw threads. Fig. 5 shows a top face view of a nut embodying my invention, and Fig. 6 shows a perspective view of the wedge for locking the sliding bar.

Referring to the accompanying drawing, I have used the reference numeral 10 to indicate a bolt having a head 11 at one end and a screw threaded portion 12 at its other end.

In Fig. 1 of the drawing, I have shown two articles to be clamped together indicated by the numerals 13 and 14 and having the bolt passed through them. Washers 15 are shown in said figure as applied to the sides of said articles through which the bolt is passed. The nut comprises a body portion 16 having a screw threaded opening 17 to receive the screw threaded portion of the bolt 12. The said nut is also provided with an opening 18 extended radially from its center through one of the faces of the nut. This opening is preferably round in cross section. Extended parallel to the bore of the nut is a tapered opening 19 which also passes through the central portion of the opening 18. For convenience in description I have employed the terms outer and inner to indicate the respective faces of the nut, the outer face being the one farthest from the head of the bolt to which the nut is applied. Said opening 19 extends completely through the nut from its inner to its outer surface.

Slidingly mounted in the opening 18 is a locking bar 20 fitted into the opening 18 and having its inner surface made concave at 21 and also screw threaded, as clearly shown in Fig. 4, so that it will fit into the screw threads of the bolt 12. This bar 20 is of such length that when its inner end engages the bolt 12, its outer end will be substantially flush with the edge of the nut. The said bar 20 is also provided with an opening 22 extended through it and designed to be in alinement with the opening 19. A locking wedge 23 is provided and extends from the inner face of the nut through the opening 19 and also through the opening 22 in the bar 20 and its small end projects beyond the outer face of the nut as clearly shown in Fig. 1. The parts are so arranged and proportioned that when assembled in the position shown in Fig. 1, the nut may be turned in a direction to move it toward the adjacent washer 15, whereupon the inner end of the wedge 23 will engage the washer 15 thus forcing the wedge outwardly and at the same time forcing the locking bar 20 into firm engagement with the screw threaded portion of the bolt 10 so that when the nut is seated it is also firmly held against unscrewing movement. The nut may however be turned a short distance on the bolt even when the bar 20 is firmly held against the bolt. Therefore if at any time it is desired to unscrew the nut the operator may turn it a part revolution and he may then strike upon the outer end of the wedge 23 to force the wedge inwardly and to permit the bar 20 to move away from the bolt 10 so that the nut will readily and easily unscrew for the remainder of the distance on the bolt 10. By reason of the fact that the wedge 23 has a tapering surface it is obvious that when said wedge is forced inwardly, as just described, it will thereby lose its tendency to hold the bar 20 firmly locked against the bolt and the bar 20 will be free to move outwardly sufficiently to free the inner end thereof from engagement with the bolt. It is essential in a device of this kind that the wedge 23 be provided with a long tapered surface to engage the nut so that if wear should take place between the parts being clamped together and the nut which would result in there being a space between the nut and the articles being clamped together, the wedge would still firmly hold the bar 20 against the bolt 10. In a device of this kind where the bar 20 is thus held against the bolt, it is essential that some means be provided for relieving the wedge 23 by manually applied means in order to unscrew the nut. For this reason, I have provided a long tapering wedge 23 that extends completely through the nut from its inner to its outer face and to project beyond the outer face so that the operator may, with a wrench or other implement, first turn the nut a part revolution and then strike upon the projecting outer end of the wedge 23 to thereby loosen the bar 20. It is to be noted that if the wedge 23 were of such size and shape that it would automatically release the bar 20 when the nut is moved slightly away from the adjacent washer, then after slight wear had taken place between the nut and the articles to be clamped together, the said wedge might move inwardly and thus release the bar 20 and permit the nut to be unscrewed and lost by means of vibration imparted to the parts to be clamped together such, for instance, as the rails and fish plates in a railway track.

I claim as my invention:

An improved nut lock, comprising a nut body portion having a screw threaded bore therein to receive a bolt and also having a radial opening extending from the bolt opening through the edge of the nut, said nut also having an opening therein parallel with its bore and intersecting said radial opening and extending from the inner to the outer face of the nut, a bar slidingly mounted in said radial opening and provided with an opening designed to aline with the opening in the nut that intersects the said radial opening and having its end adjacent to the bore shaped to fit a bolt and provided with screw threads, and a tapered wedge extended through the opening in the nut and through said bar, from the inner to the outer face of said nut, the smaller end of said wedge being at the outer face of the nut and both ends of the wedge being extended beyond the faces of the nut, whereby, when the nut is screwed on a bolt, the large end of the wedge will engage the articles being clamped together by the nut, and said wedge will be forced outwardly thereby to move the bar to clamping engagement with a bolt and also so arranged that the said bar may be released from the bolt by striking upon its outer end that projects beyond the outer face of the nut.

Des Moines, Iowa, Feb. 7, 1910.

LAWRENCE O'DELL HUTSON.

Witnesses:
ALFRED SMALLEY,
P. H. KNEELAND.